US006539018B1

(12) United States Patent
Huggins et al.

(10) Patent No.: US 6,539,018 B1
(45) Date of Patent: Mar. 25, 2003

(54) BROADBAND COMMUNICATION SYSTEM AND METHOD

(75) Inventors: Joseph P. Huggins, Highlands Ranch, CO (US); James W. Nevelle, Highlands Ranch, CO (US); Bruce A. Phillips, Highlands Ranch, CO (US)

(73) Assignee: Qwest Communications International Inc., Denver, CO (US)

( * ) Notice: Subject to any disclaimer, the term of this patent is extended or adjusted under 35 U.S.C. 154(b) by 0 days.

(21) Appl. No.: 09/283,792

(22) Filed: Apr. 1, 1999

(51) Int. Cl.[7] .............................................. H04L 12/56
(52) U.S. Cl. ........................... 370/395.51; 370/395.64; 370/538
(58) Field of Search .......................... 370/395.64, 389, 370/400, 395.5, 395.51, 538

(56) References Cited

U.S. PATENT DOCUMENTS 5,668,857 A * 9/1997 McHale .................. 379/93.07
5,905,726 A * 5/1999 Gupta ..................... 370/390
6,198,744 B1 * 3/2001 Huggins et al. ........ 370/395.51

* cited by examiner

Primary Examiner—Salvatore Cangialosi
(74) Attorney, Agent, or Firm—Brooks & Kushman P.c.

(57) ABSTRACT

A broadband communication system and method utilizing an asynchronous transfer mode core switch is provided. A plurality of central offices are connected to the asynchronous transfer mode network. An asynchronous transfer mode core switch connects to the asynchronous transfer mode network. The core switch is connected to each central office to allow an information provider, such as a video or data provider, to communicate with the plurality of central offices through the core switch. That is, the core switch provides numerous advantages, including a defined point of entry into the asynchronous transfer mode network.

19 Claims, 4 Drawing Sheets

BROADBAND COMMUNICATION SYSTEM AND METHOD

TECHNICAL FIELD

The present invention relates to communication systems for providing video and/or data services.

BACKGROUND ART

An existing service provider, which may be a video information provider, a data information provider, or a video and data provider, typically connects to a central office with a direct connection. For the information provider to provide service to multiple central offices, additional direct connections to the additional central offices must be provided.

Because each information provider, with existing techniques, must arrange to have their own physical connection to each central office that service is provided to, it becomes difficult and expensive for an information provider to serve a lot of different central offices over a wide area.

For the foregoing reasons, there is a need for an improved broadband communication system and associated method that overcomes the problems and limitations of the prior art.

DISCLOSURE OF INVENTION

It is, therefore, an object of the present invention to provide a broadband communication system and associated method that utilizes an asynchronous transfer mode core switch as a point of entry for an information provider.

In carrying out the above objects, a broadband communication system is provided. The system comprises an asynchronous transfer mode (ATM) network, a plurality of central offices, and an asynchronous transfer mode core switch. The plurality of central offices are connected to the asynchronous transfer mode network. The asynchronous transfer mode core switch is connected to the asynchronous transfer mode network. The core switch is connected to each central office to allow an information provider to communicate with the plurality of central offices through the core switch.

The information provider may be a video provider, a data provider, or a video and data provider. As such, the core switch may be connected to at least one of the central offices by at least one OC-3c carrier. Further, the core switch may be connected to at least one of the central offices by at least one OC-12c carrier. Preferably, OC-3c carriers are configured for two-way communication, and OC-12c carriers are configured for one-way communication. Further, as appropriate, the core switch may be connected to at least one of the central offices by at least one OC-3c carrier and further connected by at least one OC-12c carrier.

Further, in carrying out the present invention, a broadband communication system comprising a very high bit rate digital subscriber line (VDSL) asynchronous transfer mode (ATM) network is provided. The system further comprises a plurality of central offices connected to the asynchronous transfer mode network. An asynchronous transfer mode core switch connects the asynchronous transfer mode network to each central office to allow an information provider to communicate with the plurality of central offices through the core switch.

Still further, in carrying out the present invention, a broadband communication method is provided. The method comprises connecting a plurality of central offices to an asynchronous transfer mode network, and connecting a core switch to the asynchronous transfer mode network such that the core switch is connected to each central office. The core switch allows an information provider to communicate with the plurality of central offices through the asynchronous transfer mode network.

The advantages associated with embodiment of the present invention are numerous. For example, systems and methods of the present invention allow multicasting from an information provider to the plurality of central offices. Utilization of ATM multicasting allows for the transmission of a single source, such as a video source, to multiple destinations. The ATM core switch receives a single video input and provides multiple identical copies to multiple outgoing interface ports.

Further, embodiments of the present invention may be configured to provide switched virtual connections (SVC). ATM switched virtual connections allow the customer to select video information in real time, and may even be configured with features such as pause, rewind, and fast forward. Further, embodiments of the present invention allow the core switch to aggregate information received from a plurality of information providers, and to communicate the aggregated information to the plurality of central offices.

Still further, embodiments of the present invention advantageously may be configured to allow the core switch to statistically multiplex information received from a plurality of the information providers. Still further, embodiments of the present invention are advantageous in that a core switch may be utilized to define a point of entry into the asynchronous transfer mode network for video, data, and video/data information providers.

The above object and other objects, features, and advantages of the present invention will be apparent from the following detailed description of the best mode for carrying out the invention when taken in connection with the accompanying drawings.

BEST MODE FOR CARRYING OUT THE INVENTION

Figure 1:
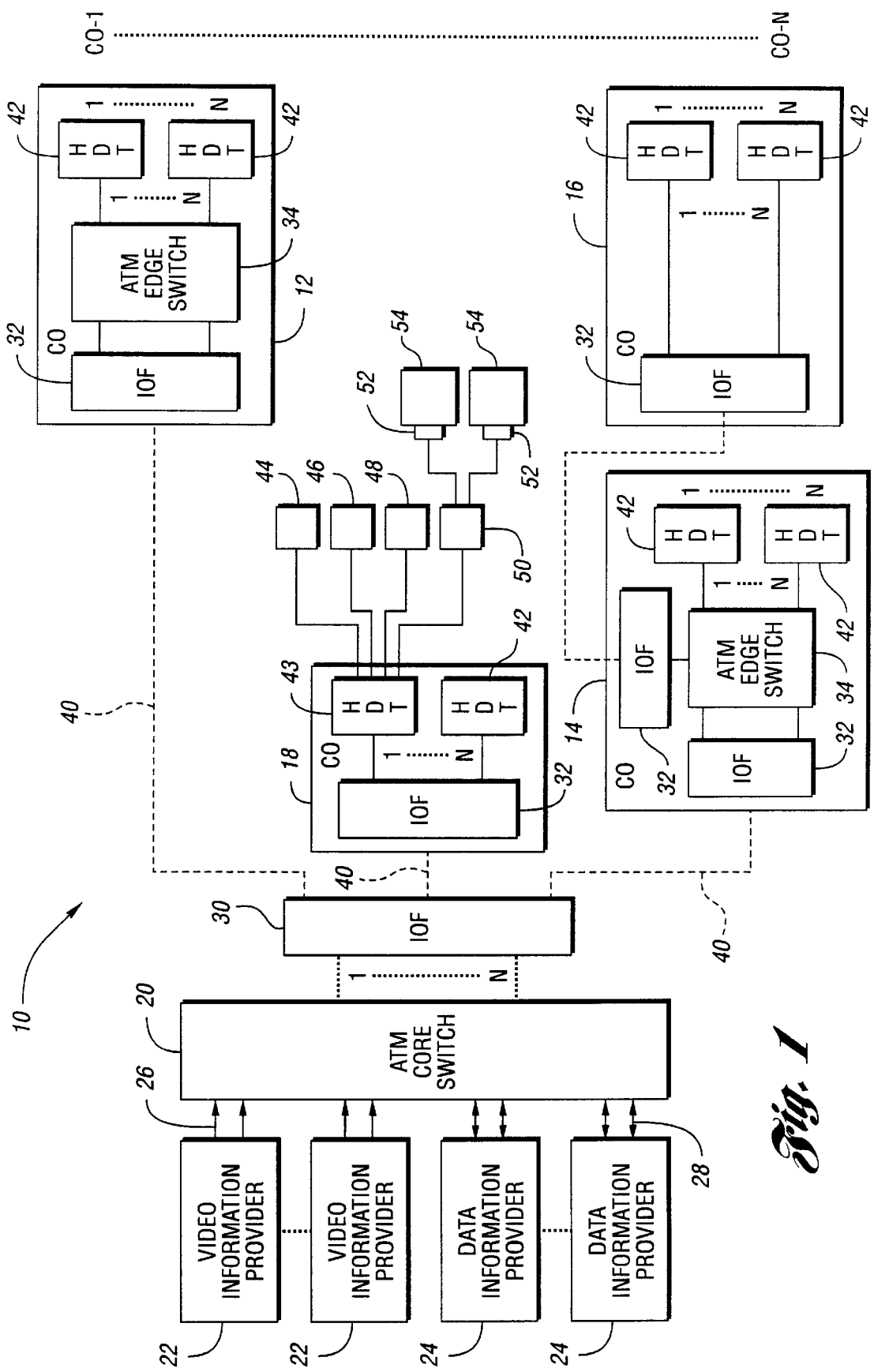
FIG. 1 is an ATM-based VDSL architecture of the present invention, showing the ATM core switch.

With reference to FIG. 1, an asynchronous transfer mode (ATM) based very high bit rate digital subscribe line (VDSL) architecture utilizing an ATM core switch is generally indicated at 10. Asynchronous transfer mode or ATM is a high bandwidth, low-delay, connection-oriented, packet-like switching and multiplexing technique. ATM transmissions are cell-based, with cells having a fixed length. Information is presented to the network asynchronously. However, the switches and interlinking transmission facilities are synchronized. Of course, it is to be appreciated that the term "asynchronous transfer mode" as used herein is meant to encompass equivalent network architectures in addition to traditional ATM.

As mentioned above, preferred embodiments of the present invention utilize very high bit rate digital subscriber line techniques over the ATM network 10. VDSL, which is preferred for the present invention, is a variation of xDSL. xDSL is a generic term for digital subscriber line equipment and services, including packet-based architectures (or cell-based architectures) such as ADSL, HDSL, SDSL, VDSL, and RADSL. That is, x is the generic. xDSL technologies provide extremely high bandwidth.

In the group of xDSL services, VDSL services are of particular interest for a hybrid local loop scenario. In particular, embodiments of the present invention are suitable for fiber-to-the-neighborhood (FTTN) or fiber-to-the-node, and also for fiber-to-the curb. The ATM network is composed primarily of fiber and provides distribution for providers, through the core switch to the various central offices. Fiber may then extend from the central office to host digital terminals, and then to network units. VDSL over twisted pair (TP) carries the signal the last leg to the individual residential premises. Of course, although VDSL is a suitable encoding technique for embodiments of the present invention, it is to be appreciated that other techniques may be appropriate based on the application and the network configuration.

With continuing reference to FIG. 1, ATM network 10 is connected to a plurality of central offices 12, 14, 16, 18. An asynchronous transfer mode core switch 20 is also connected to ATM network 10. Core switch 20 is connected to each central office 12, 14, 16, 18. Advantageously, video information providers 22 and data information providers 24 (and video and data information providers, not specifically shown) communicate with central offices 12, 14, 16, 18 through core switch 20.

It is to be appreciated that there may be many different types of physical connections that are appropriate for use in ATM network 10. As shown in FIG. 1, a suitable connection from video information provider 22 to core switch 20 is one-directional OC-12c. OC-12c can provide a bandwidth of about 622 megabits per second. Further, a suitable connection from data service providers 24 to core switch 20 is bi-directional OC-3c. OC-3c may support up to about 155 megabits per second. In FIG. 1, the connection from video information providers 22 to core switch 20 is indicated at 26, and the connection from data information providers 24 to core switch 20 is indicated at 28.

Preferably, ATM core switch 20 and central offices 12, 14, 16, 18 connect to the asynchronous transfer mode network 10 at inter-office facilities 30 and 32, respectively. As shown in central offices 12 and 14, one suitable way to connect the central office to the ATM network is with an ATM edge switch 34. ATM core switch 20 may be suitably connected to each central office 12, 14, 16, 18 by multiple OC-3cs and OC-12cs, which are indicated at 40.

Further, central offices 12, 14, 16, 18 include any number of host digital terminals (HDT) that are utilized to extend the reach of the central office. As best shown at central office 18, a host digital terminal 43 extends to a number of network units 44, 46, 48, 50. Preferably, fiber is used from ATM core switch 20 to the network units, 44, 48, 50 (that is, fiber to the neighborhood). At the network unit in the neighborhood, as shown at network unit 50, signals are further routed to a network interface 52 at a customer site 54. As the connection between network unit 50 and interface 50 is at the furthest reach of the asynchronous transfer mode network 10, this connection is preferably twisted pair such as existing copper twisted pair. That is, VDSL over fiber runs from the video and data information providers 20 and 22, respectively, through core switch 20, to the neighborhood at network unit 50 over fiber. Then, information is routed from network unit 50 to interface 52 over twisted pair. Alternatively, a fiber-to-the-curb arrangement may be employed.

Embodiments of the present invention have many advantages. For example, multicasting of video streams, switched digital video delivery, aggregation of data traffic, and statistical multiplexing of data traffic may all be performed as will be better described with reference to the remaining figures.

Figure 2:
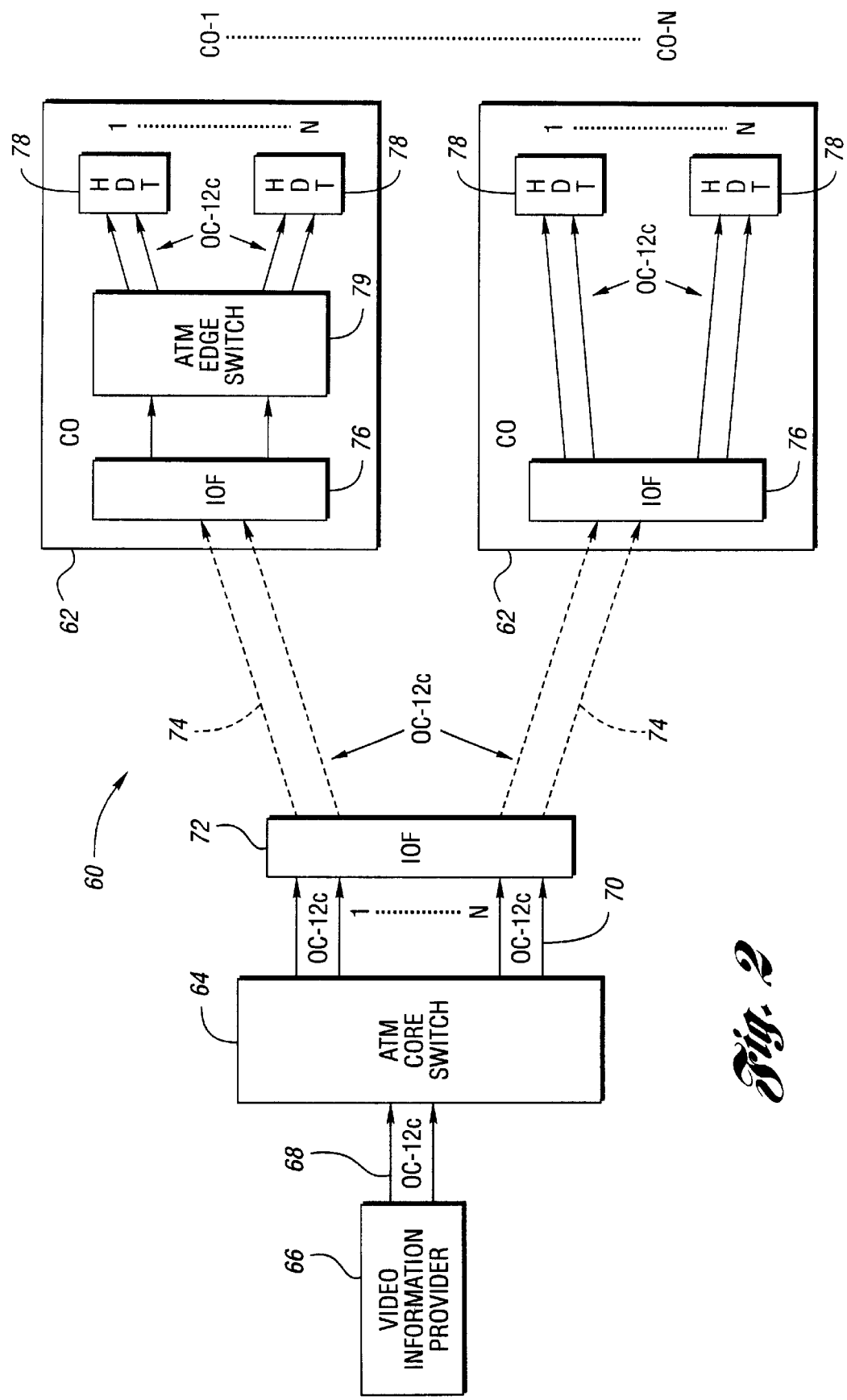
FIG. 2 is an ATM-based VDSL architecture of the present invention, showing the multicasting of video streams.

With reference now to FIG. 2, an asynchronous transfer mode network is generally indicated at 60. ATM network 60 connects to central offices 62. Further, asynchronous transfer mode network 60 is connected to ATM core switch 64. In this embodiment, a video information provider 66 connects to core switch 64 over line 68, which in a suitable implementation is OC-12c. Line 70, which is preferably also multiple OC-12c connections, connects ATM core switch 64 to inter-office facility 72. Further, multiple OC-12c connection 74 connect inter-office facility 72 to inter-office facilities 76 at the central offices 62.

Within each central office 62, an ATM edge switch 76 may be used to connect to any number of host digital terminals 78. From host digital terminals 78, the network extends the rest of the way to the end user in a similar way as shown in FIG. 1.

As best shown in FIG. 2, video information provider 66 utilizes ATM core switch 64 to multicast video streams. ATM multicasting allows for the transmission of a single video source to multiple destinations. The ATM core switch 64 receives a single video input (from each video information provider as there may be more than one provider) and provides multiple identical copies to multiple outgoing interface ports, at multiple central offices 62.

Figure 3:
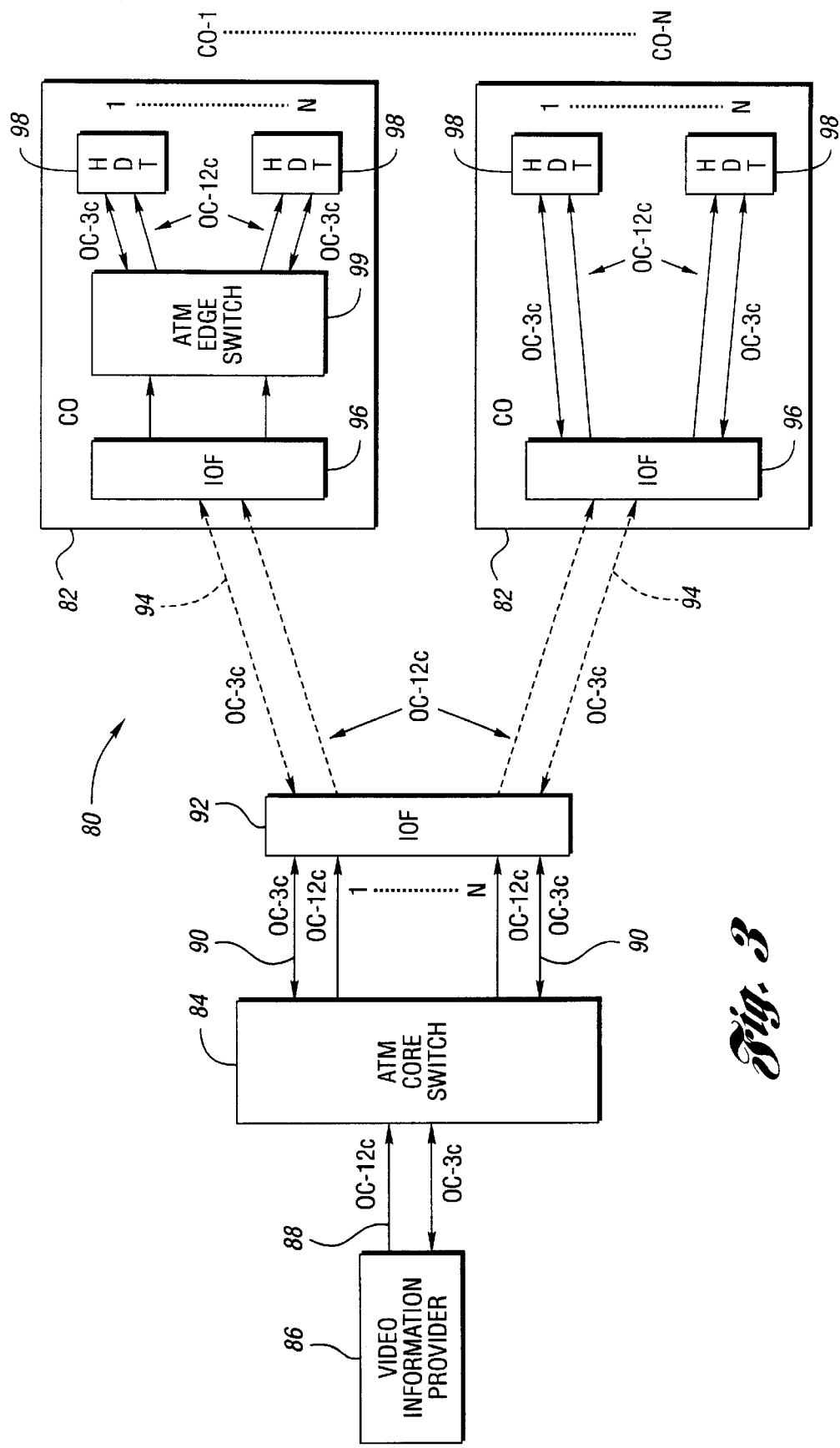
FIG. 3 is an ATM-based VDSL architecture of the present invention, showing the use of ATM-switched virtual connections.

With reference now to FIG. 3, another embodiment of the present invention is illustrated. An asynchronous transfer mode network 80, in this embodiment, is utilized to provide switched digital video services with ATM switched virtual connections. A plurality of central offices 82 are connected to an ATM core switch 84 over asynchronous transfer mode network 80. A video information provider 86 communicates with ATM core switch 84, suitably over OC-12c and OC-3c connections. That is, the OC-12c connection provides one-way video, while the bi-directional OC-3c connections are used for SVC signaling.

Appropriately, OC-3c and OC-12c connections 90 are used between ATM core switch 84 and inter-office facility 92. Thereafter, OC-3c and OC-12c connections 94 connect inter-office facility 92 to inter-office facilities 96 at central offices 80. At each central office, a number of host digital terminals 98 receive signals over the asynchronous transfer mode network, possibly through an ATM edge switch 99. From each host digital terminal, the network extends out to an endcustomer site, preferably utilizing VDSL over twisted pair.

In accordance with this embodiment of the present invention, ATM network 80 has the ability to deliver switched digital video services utilizing ATM switched virtual connections. As such, connections over asynchronous transfer mode network 80 for video services are made on a demand-basis, and a customer may be able to select a given video content in real-time. Further, it may be suitable to implement other real-time features such as pause, rewind, fast forward, and the like.

Figure 4:
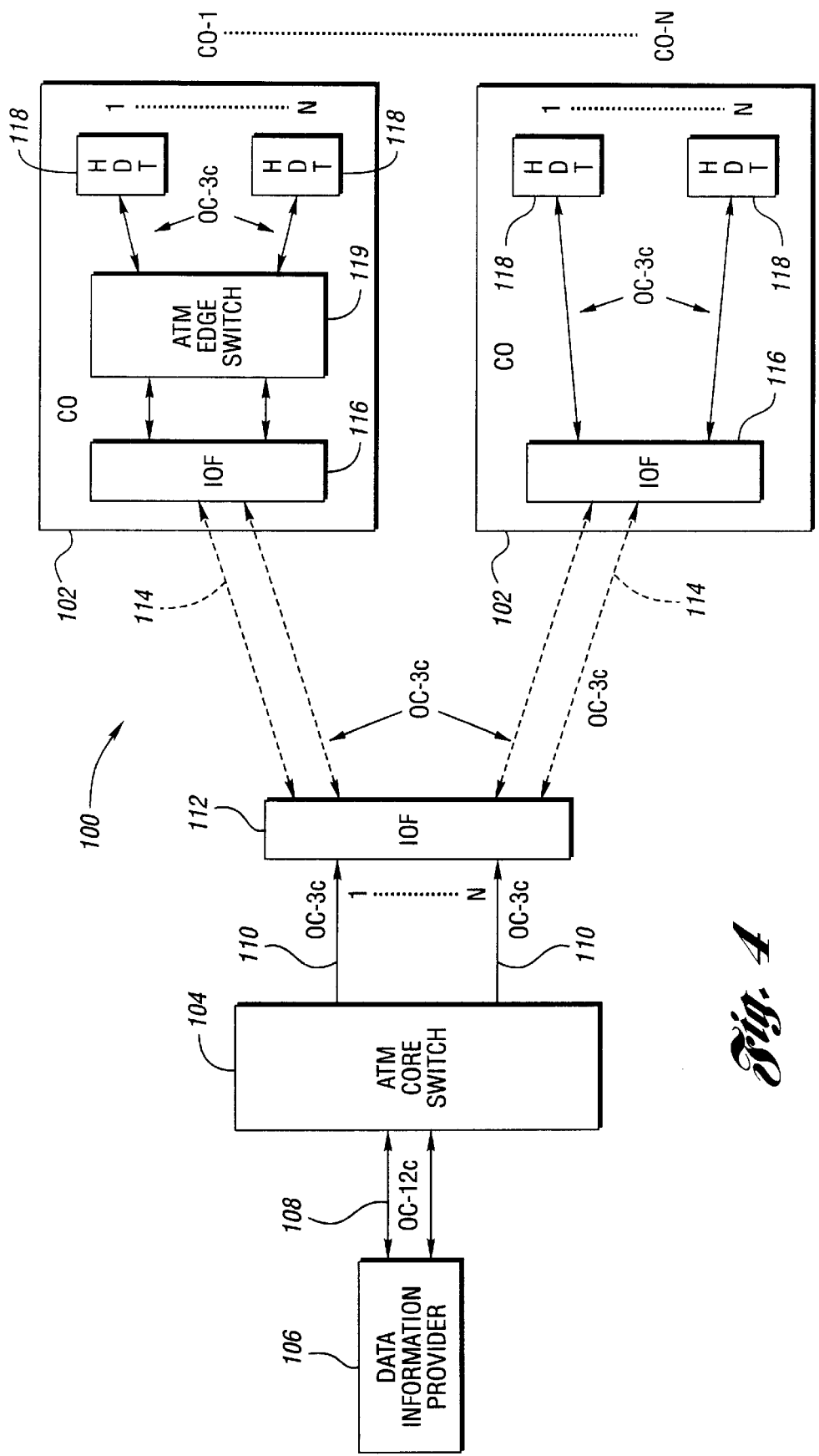
FIG. 4 is an ATM-based VDSL architecture of the present invention, showing aggregation and statistical multiplexing of data traffic.

With reference to FIG. 4, yet another embodiment of the present invention is illustrated. Asynchronous transfer mode network 100 illustrates aggregation and statistical multiplexing of data traffic in accordance with the present invention. Asynchronous transfer mode network 100 connects to a plurality of central offices 102. Further, an ATM core switch 104 communicates over asynchronous transfer mode network 100 with central offices 102. A data information provider 106 communicates with ATM core switch 104 over a suitable connection 108, which may be an OC-3c. Further, connections 110 allow core switch 104 to communicate with inter-office facility 112. Connections 110 are suitably implemented as OC-3c over fiber.

Extending further along the network, connections 114 connect inter-office facility 112 with inter-office facilities 116 at central offices 102. At each central office 102, any number of host digital terminals 118 may be provided, possibly at an ATM edge switch 119. ATM core switch 104 may receive data input from various interface ports, from any number of data information providers. As such, some interface ports may be filled to capacity while others are not. Regardless of ATM class of service, ATM core switch 104 may advantageously aggregate the incoming data onto a common outgoing port so that the outgoing port is filled to a greater percent of capacity.

In accordance with the present invention, aggregation provides a methodology for reducing the number of interface ports required by a given data information provider. Further, and as also shown in FIG. 4, ATM core switch 104 is configured to statistically multiplex data traffic in preferred embodiments of the present invention. That is, assuming data traffic is received as unspecified bit rates or available bit rates, ATM core switch 104 provides statistical multiplexing gains on those data streams. Still further, ATM core switch 104 provides a defined point of entry into asynchronous transfer mode network 100 for video, data, and video and data information providers.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A broadband communication system comprising:
    an asynchronous transfer mode network;
    a plurality of central offices connected to the asynchronous transfer mode network; and
    an asynchronous transfer mode core switch connected to the asynchronous transfer mode network, wherein the core switch is connected to each central office to allow a plurality of information providers to communicate with the plurality of central offices through the core switch and wherein the core switch is configured to aggregate information received from the plurality of information providers, and to communicate the aggregated information to the plurality of central offices.

2. The system of claim 1 wherein the core switch is connected to at least one of the central offices by at least one OC-3c carrier.

3. The system of claim 2 wherein the at least one OC-3c carrier is configured for two-way communication.

4. The system of claim 1 wherein the core switch is connected to at least one of the central offices by at least one OC-12c carrier.

5. The system of claim 4 wherein the at least one OC-12c carrier is configured for one-way communication from the core switch to the at least one of the central offices.

6. The system of claim 1 wherein the core switch is connected to at least one of the central offices by at least one OC-3c carrier and further connected by at least one OC-12c carrier.

7. The system of claim 1 wherein the core switch is configured to provide multicasting from the information provider to the plurality of central offices.

8. The system of claim 7 wherein the information provider is a video information provider, and wherein the core switch is configured to provide video multficasting.

9. The system of claim 1 wherein the asynchronous transfer mode network is configured to provide switched virtual connections.

10. The system of claim 1 wherein the core switch is configured to statistically multiplex information received from a plurality of information providers, and to communicate the multiplexed information to the plurality of central offices.

11. The system of claim 1 wherein the core switch connects to the asynchronous transfer mode network at an inter office facility.

12. The system of claim 1 further comprising:
    at least one host digital terminal at at least one of the central offices for connecting to a plurality of end users.

13. A broadband communication system comprising:
    a VDSL asynchronous transfer mode network;
    a plurality of cental offices connected to the asynchronous transfer mode network; and
    an asynchronous transfer mode core switch connected to the asynchronous transfer mode network, wherein the core switch is connected to each central office to allow a plurality of information providers to communicate with the plurality of central offices through the core switch and wherein the core switch is configured to aggregate information received from the plurality of information providers, and to communicate, the aggregated information to the plurality of central offices.

14. The system of claim 13 further comprising:
    at least one host digital terminal at at least one of the plurality of central offices for connecting to a plurality of end users.

15. The system of claim 14 further comprising:
    a network unit connected to one of the host digital terminals.

16. The system of claim 15 wherein a twisted pair connects the network unit to an end user.

17. The system of claim 13 wherein the information provider is a video information provider.

18. The system of claim 13 wherein the information provider is a data information provider.

19. A broadband communication method comprising:
    connecting a plurality of central offices to an asynchronous transfer mode network; and
    connecting a core switch to the asynchronous transfer mode network such that the core switch is connected to each central office to allow a plurality of information providers to communicate with the plurality of central offices through the asychronrous transfer mode network and wherein the core switch is configured to aggregate information received from the plurality of information providers, and to communicate the aggregated information to the plurality of central offices.

* * * * *